(12) United States Patent
Lovitt et al.

(10) Patent No.: US 10,574,472 B1
(45) Date of Patent: Feb. 25, 2020

(54) SYSTEMS AND METHODS FOR SMOOTHLY TRANSITIONING CONVERSATIONS BETWEEN COMMUNICATION CHANNELS

(71) Applicant: Facebook Technologies, LLC, Menlo Park, CA (US)

(72) Inventors: Andrew Lovitt, Redmond, WA (US); Antonio John Miller, Woodinville, WA (US); Philip Robinson, Seattle, WA (US); Scott Selfon, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/178,231

(22) Filed: Nov. 1, 2018

(51) Int. Cl.
| | | |
|---|---|---|
| *H04L 12/18* | (2006.01) | |
| *H04R 3/00* | (2006.01) | |
| *G10L 15/30* | (2013.01) | |
| *H04R 3/12* | (2006.01) | |
| *H04R 5/04* | (2006.01) | |
| *G06F 3/16* | (2006.01) | |

(52) U.S. Cl.
CPC .......... *H04L 12/1818* (2013.01); *G06F 3/165* (2013.01); *G10L 15/30* (2013.01); *H04R 3/005* (2013.01); *H04R 3/12* (2013.01); *H04R 5/04* (2013.01)

(58) Field of Classification Search
CPC .. H04R 3/005; H04R 5/04; H04R 3/12; G10L 15/30; G06F 3/165; H04L 12/1818
USPC ..................................................... 381/92, 123
See application file for complete search history.

(56) References Cited

U.S. PATENT DOCUMENTS 9,423,870 B2 * 8/2016 Teller ...................... G06F 3/013

\* cited by examiner

*Primary Examiner* — Paul Kim
(74) *Attorney, Agent, or Firm* — FisherBroyles, LLP

(57) ABSTRACT

The disclosed computer-implemented method may include (1) establishing a communication channel to indirectly convey a conversation, (2) receiving, via the communication channel, a portion of the conversation, (3) presenting the portion of the conversation to a user, (4) receiving, via the communication channel, an additional portion of the conversation, (5) detecting an additional communication channel capable of conveying the conversation, (6) determining a human-perceivable difference between how the conversation has been conveyed via the communication channel and how the conversation will be conveyed via the additional communication channel, and (7) compensating for the human-perceivable difference when presenting the additional portion of the conversation to the user in order to smoothly transition the conversation from the communication channel to the additional communication channel. Various other methods, systems, and computer-readable media are also disclosed.

19 Claims, 11 Drawing Sheets

Method 600

Start

Establish a first communication channel between a first computing device and a second computing device to indirectly convey a conversation between a first user of the first computing device and a second user of the second computing device
610

Receive, from the second computing device at the first computing device via the first communication channel, a first portion of the conversation
620

Present, via the first computing device, the first portion of the conversation to the first user
630

Receive, from the second computing device at the first computing device via the first communication channel, a second portion of the conversation
640

Detect a second communication channel capable of conveying the conversation between the first user and the second user
650

Determine a human-perceivable difference between how the conversation has been conveyed via the first communication channel and how the conversation will be conveyed via the second communication channel
660

Compensate for the human-perceivable difference when presenting, via the first computing device, the second portion of the conversation to the first user in order to smoothly transition the conversation from the first communication channel to the second communication channel
670

End

*FIG. 6*

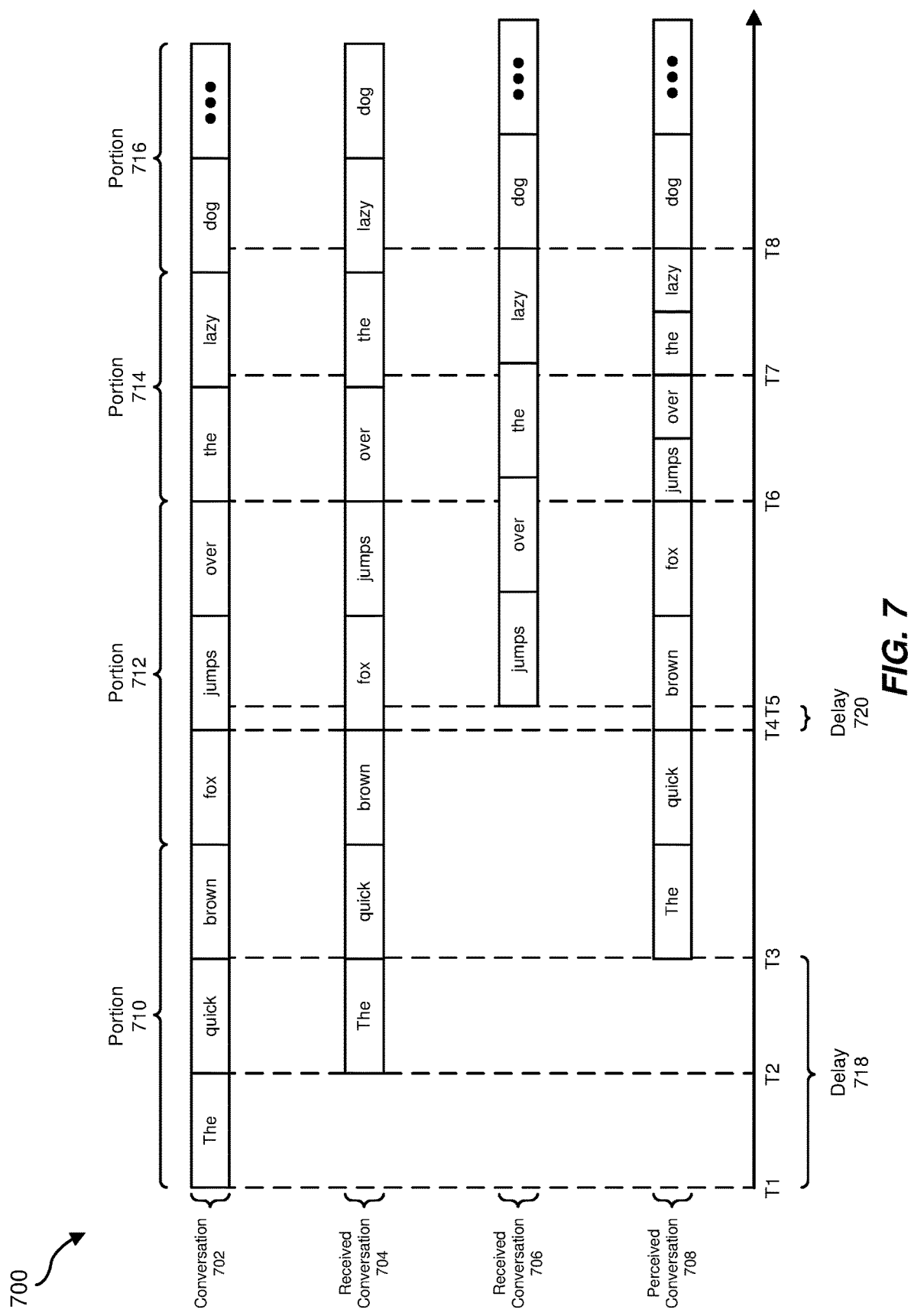

US 10,574,472 B1

SYSTEMS AND METHODS FOR SMOOTHLY TRANSITIONING CONVERSATIONS BETWEEN COMMUNICATION CHANNELS

BACKGROUND

Live conversations between two or more individuals may be direct conversations (i.e., in-person face-to-face conversations) conveyed via the individuals physical environment or indirect conversations conveyed via various forms of electronic communication technologies. In some situations, a live conversation between two individuals may transition from being a direct conversation to an indirect conversation or vice versa. For example, two individuals may start a conversation face to face and continue the conversation some time later via an indirect communication channel when they are no longer in the same physical environment. Likewise, two individuals may begin an indirect conversation via an indirect communication channel but later transition to a direct conversation when they encounter each other face to face.

Using conventional communication technologies, users may need to manually transition their live conversations from direct conversations to indirect conversations or vice versa. For example, when one participant of a conversation must leave the presents of the other participants of the conversation, the participants may need to agree upon and manually establish a form of indirect communication (e.g., agree upon and establish a telephone call) by which their conversation may continue. Likewise, when one participant of an indirect conversation reaches or encounters the other participants of the conversation, the participants may need to close their indirect form of communication (e.g., close a telephone call) before continuing their conversation face to face.

Such manual transitions between direct conversations and indirect conversations may be abrupt and distracting to the conversations' participants. Moreover, various differences between how conversations are perceived when conveyed via different communication channels may also be perceived as abrupt or distracting, especially when the different communication channels simultaneously convey the conversations. For example, most indirect forms of communication introduce a noticeable delay between when something is said by one participant of a conversation and when it is heard by the other parties of the conversation. If the participants of a conversation establish an indirect communication channel while still communicating directly, the delay introduced by the indirect communication channel may distract the participants from their direct communications or vice versa. The instant disclosure, therefore, identifies and addresses a need for systems and methods that enable live conversations to be automatically and/or smoothly transitioned between different communication channels, especially between direct and indirect communication channels.

SUMMARY

As will be described in greater detail below, the instant disclosure describes systems and methods for automatically and/or smoothly transitioning conversations between different communication channels, especially between direct and indirect communication channels. In one example, a computer-implemented method for transitioning conversations between communication channels may include (1) receiving, at a first computing device, a portion of a conversation between a first user of the first computing device and a second user of a second computing device, (2) determining a human-perceivable difference between how the conversation has been conveyed via a first communication channel and how the conversation will be conveyed via a second communication channel, and (3) compensating for the human-perceivable difference when presenting, via the first computing device, the portion of the conversation to the first user in order to smoothly transition the conversation from the first communication channel to the second communication channel. In some examples, at least one of the first communication channel or the second communication channel may be capable of indirectly conveying the conversation between the first user and the second user. In another example, a computer-implemented method for transitioning conversations between communication channels may include (1) establishing a first communication channel between a first computing device and a second computing device to indirectly convey a conversation between a first user of the first computing device and a second user of the second computing device, (2) receiving, from the second computing device at the first computing device via the first communication channel, a first portion of the conversation, (3) presenting, via the first computing device, the first portion of the conversation to the first user, (4) receiving, from the second computing device at the first computing device via the first communication channel, a second portion of the conversation, (5) detecting, before presenting the second portion of the conversation to the first user, a second communication channel (e.g., a physical environment) capable of conveying the conversation between the first user and the second user, (6) determining a human-perceivable difference between how the conversation has been conveyed via the first communication channel and how the conversation will be conveyed via the second communication channel, and (7) compensating for the human-perceivable difference when presenting, via the first computing device, the second portion of the conversation to the first user in order to smoothly transition the conversation from the first communication channel to the second communication channel.

In some examples, the second communication channel may be a physical environment of the first user and the second user, and the step of detecting the second communication channel may include determining when the physical environment of the first user may be capable of directly conveying the conversation between the first user and the second user. In one example, the step of determining when the physical environment may be capable of directly conveying the conversation between the first user and the second user may include detecting, using a simultaneous localization and mapping sensor of the first computing device, when the first user and the second user will be present within the physical environment. In some examples, the step of detecting when the first user and the second user will be present within the physical environment may include (1) detecting the first user entering a room occupied by the second user or (2) detecting the second user entering a room occupied by the first user. In other examples, the step of determining when the physical environment may be capable of directly conveying the conversation between the first user and the second user may include detecting, using a microphone of the first computing device, a third portion of the conversation being directly conveyed by the physical environment from the second user to the first user.

In some examples, the first portion of the conversation may include a first audio portion, the second portion of the conversation may include a second audio portion, and a third audio portion of the conversation may be conveyed via the second communication channel. In some examples, the step of determining the human-perceivable difference may include determining that the first user's perceived spatial localization of a third portion of the conversation conveyed via the second communication channel will be different than the first user's perceived spatial localization of the first portion of the conversation, and the step of compensating for the human-perceivable difference when presenting the second portion of the conversation may include presenting at least some of the second portion of the conversation to the first user such that the first user's perceived spatial localization of the second portion of the conversation may be substantially similar to the first user's perceived spatial localization of the third portion of the conversation conveyed via the second communication channel.

In some examples, the step of determining the human-perceivable difference may include determining that a perceived acoustic property of a third portion of the conversation conveyed via the second communication channel will be different than the perceived acoustic property of the first portion of the conversation conveyed via the first communication channel, and the step of compensating for the human-perceivable difference when presenting the second portion of the conversation may include presenting the second portion of the conversation to the first user such that the perceived acoustic property of at least some of the second portion of the conversation conveyed via the first communication channel may be substantially similar to the perceived acoustic property of the third portion of the conversation conveyed via the second communication channel.

In some examples, the step of determining the human-perceivable difference may include determining that a temporal delay of a third portion of the conversation conveyed via the second communication channel will be less than a temporal delay of the first portion of the conversation conveyed via the first communication channel, and the step of compensating for the human-perceivable difference when presenting the second portion of the conversation may include temporally compressing the second portion of the conversation before presentation to the first user.

In some examples, the second communication channel may be a physical environment of the first user and the second user, and the computer-implemented method may further include (1) receiving, at the first computing device, the third portion of the conversation, (2) preventing, at the first computing device while the second portion of the conversation is presented to the first user, the first user from perceiving the third portion of the conversation, (3) temporally compressing the third portion of the conversation, and (4) presenting, via the first computing device after presenting the second portion of the conversation, the third portion of the conversation to the first user.

In some examples, the second communication channel may be a physical environment of the first user and the second user, the step of determining the human-perceivable difference may include determining that a third portion of the conversation conveyed via the physical environment will include a first direct-path acoustical component and a first reflected-path acoustical component, and the step of compensating for the human-perceivable difference when presenting the second portion of the conversation to the first user may include (1) estimating a second direct-path acoustical component for the second portion of the conversation, (2) estimating a second reflected-path acoustical component for the second portion of the conversation, (3) presenting, via the first computing device, the second direct-path acoustical component to the first user such that the first user's perceived spatial localization of the second direct-path acoustical component may be substantially similar to the first user's perceived spatial localization of the first direct-path acoustical component, and (4) presenting, via the first computing device, the second reflected-path acoustical component to the first user such that the first user's perceived spatial localization of the second reflected-path acoustical component may be substantially similar to the first user's perceived spatial localization of the first reflected-path acoustical component. In some examples, the second direct-path acoustical component and the second reflected-path acoustical component are estimated using at least one of a simultaneous localization and mapping sensor of the first computing device or a simultaneous localization and mapping sensor of the second computing device.

In another example, a computer-implemented method for transitioning conversations between communication channels may include (1) monitoring, via a first computing device, a conversation between a first user of the first computing device and a second user of a second computing device, a first portion of the conversation being conveyed via a first communication channel, (2) establishing, between the first computing device and the second computing device, a second communication channel capable of indirectly conveying the conversation between the first user and the second user, (3) receiving, at the first computing device, a second portion of the conversation between the second user and the first user, (4) determining a human-perceivable property of the conversation conveyed via the first communication channel, and (5) compensating for the human-perceivable property when presenting, via the first computing device, the second portion of the conversation to the first user in order to smoothly transition the conversation from the first communication channel to the second communication channel.

In some examples, the first communication channel may be a physical environment of the first user and the second user, and the computer-implemented method may further include (1) detecting when the physical environment will be incapable of directly conveying the conversation between the first user and the second user and (2) making, in response to detecting when the physical environment will be incapable of directly conveying the conversation between the first user and the second user, the transition by using the second communication channel to indirectly convey the second portion of the conversation between the first user and the second user. In some examples, the step of detecting when the physical environment will be incapable of directly conveying the conversation between the first user and the second user may include detecting, using a simultaneous localization and mapping sensor of the first computing device, when the first user and the second user will not both be present within the physical environment.

In some examples, the step of determining the human-perceivable property may include determining the first user's perceived spatial localization of the first portion of the conversation, and the step of compensating for the human-perceivable property when presenting the second portion of the conversation may include presenting at least some of the second portion of the conversation to the first user such that the first user's perceived spatial localization of the second portion of the conversation may be substantially similar to the first user's perceived spatial localization of the first portion of the conversation conveyed via the first communication channel.

In some examples, the step of determining the human-perceivable property may include determining an acoustic property of the first portion of the conversation conveyed via the first communication channel, and the step of compensating for the human-perceivable property when presenting the second portion of the conversation may include presenting the second portion of the conversation to the first user such that the acoustic property of at least some of the second portion of the conversation conveyed via the second communication channel may be substantially similar to the perceived acoustic property of the first portion of the conversation conveyed via the first communication channel.

In some examples, the step of determining the human-perceivable property may include determining that a temporal delay of a third portion of the conversation conveyed via the second communication channel will be more than a temporal delay of the first portion of the conversation conveyed via the first communication channel, and the step of compensating for the human-perceivable property when presenting the second portion of the conversation may include temporally stretching the second portion of the conversation before presentation to the first user.

In addition, a corresponding system for transitioning conversations between communication channels may include at least one physical processor and physical memory with computer-executable instructions that, when executed by the physical processor, cause the physical processor to (1) establish, between the communication system and an additional communication system, a first communication channel to indirectly convey a conversation between a first user of the communication system and a second user of the additional communication system, (2) receive, from the additional communication system at the communication system via the first communication channel, a first portion of the conversation, (3) present, via the communication system, the first portion of the conversation to the first user, (4) receive, from the additional communication system at the communication system via the first communication channel, a second portion of the conversation, (5) detect, before presenting the second portion of the conversation to the first user, a second communication channel capable of conveying the conversation between the first user and the second user, (6) determine a human-perceivable difference between how the conversation has been conveyed via the first communication channel and how the conversation will be conveyed via the second communication channel, and (7) compensate for the human-perceivable difference when presenting, via the communication system, the second portion of the conversation to the first user in order to smoothly transition the conversation from the first communication channel to the second communication channel.

In some examples, the physical memory may further include additional computer-executable instructions that, when executed by the physical processor, cause the physical processor to also (1) monitor, via the communication system, an additional conversation between the first user and the second user wherein a first portion of the additional conversation may be conveyed via the second communication channel, (2) establish, between the communication system and the additional communication system, a third communication channel capable of indirectly conveying the additional conversation between the first user and the second user, (3) receive, at the communication system, a second portion of the additional conversation, (4) determine an additional human-perceivable property of the additional conversation conveyed via the second communication channel, and (5) compensate for the additional human-perceivable property when presenting, via the communication system, the second portion of the additional conversation to the first user in order to smoothly transition the conversation from the second communication channel to the third communication channel.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a flow diagram of an exemplary method for smoothly transitioning conversations from indirect communication channels, according to aspects of the present disclosure.

FIG. 7 is a timing diagram of an exemplary conversation transitioning between communication channels, according to aspects of the present disclosure.

Figure 1:
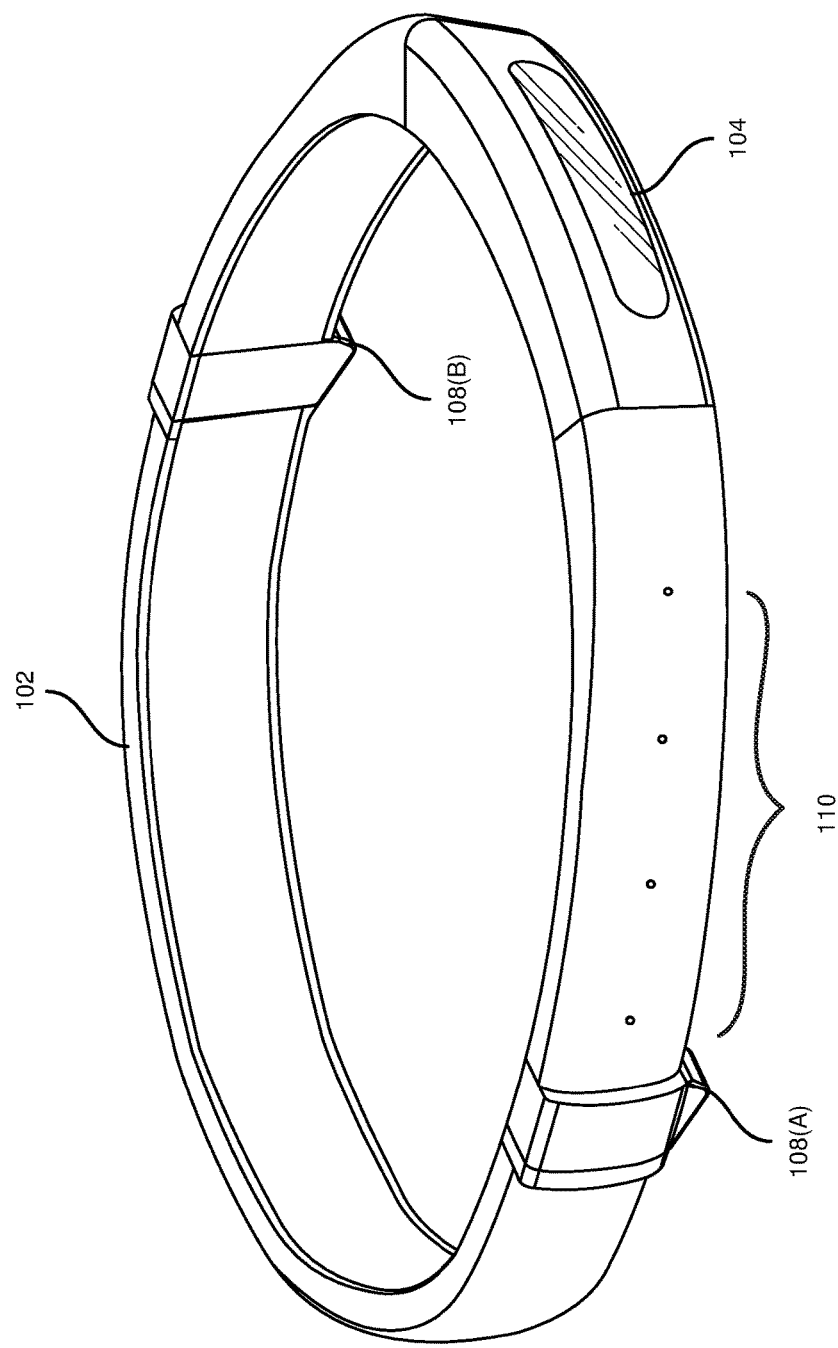
FIG. 1 illustrates an embodiment of an artificial reality headset.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for smoothly transitioning live conversations between direct (e.g., free field) and indirect communication channels. As will be explained in greater detail below, embodiments of the instant disclosure may process ongoing audio or video conversations (e.g., ongoing Voice over Internet Protocol (VoIP) conversations) conveyed via indirect communication channels in order to automatically and smoothly transition the audio or video conversations into direct in-person conversations when participants of the audio or video conversations meet face to face. Embodiments of the instant disclosure may also process audio or video conversations conveyed via indirect communication channels in order to automatically and smoothly transition direct in-person conversations to the audio or video conversations when the participants of the in-person conversations depart from one another or when their physical environments cannot adequately convey their direct in-person conversations.

In some examples, embodiments of the instant disclosure may use simultaneous localization and mapping (SLAM) data and/or other environmental information to detect when users will transition between indirect conversations and direct conversations or vice versa. When indirect conversations have delayed audio, embodiments of the instant disclosure may apply various psychoacoustic models to speed up or compress the audio just prior to transitioning to direct in-person conversations such that the delay is imperceptible. In some examples, embodiments of the instant disclosure may spatially localize audio or video conversations just prior to transitioning to direct in-person conversations such that no spatial disconnect occurs for participants during the transitions.

Embodiments of the instant disclosure may also apply various forms of environmental acoustic processing (e.g., room reverb) to indirect conversations just prior to transitioning the indirect conversations to direct in-person conversations. By applying spatial noise cancellation in noisy environments, embodiments of the instant disclosure may cause direct in-person conversations to be perceived as clearly as prior indirect conversations. By smoothly transitioning live conversations between indirect communication channels and direct communication channels, embodiments of the instant disclosure may maintain live conversations in environments that may not normally enable direct forms of conversation. Accordingly, the disclosed systems may improve existing communication technologies by, among other things, simplifying and automating transitions between direct and indirect conversations. Embodiments of the instant disclosure may also provide various other advantages and features, as discussed in greater detail below.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 100 in FIG. 1. Other artificial reality systems may include an NED that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. AR system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, AR system 100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 100 may not include an NED, AR system 100 may include other types of screens or visual feedback devices (e.g., a display screen integrated into a side of frame 102).

Figure 2:
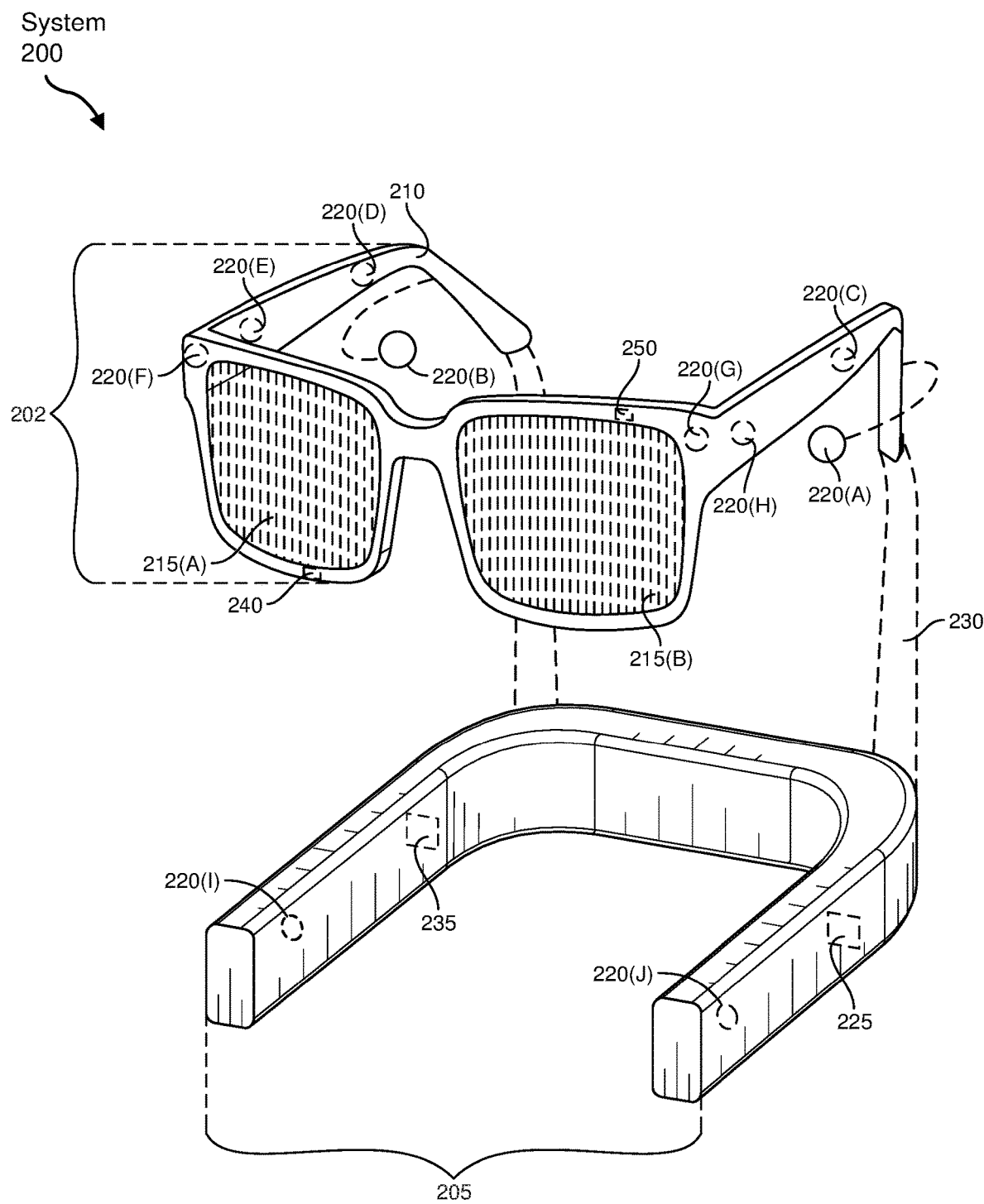
FIG. 2 illustrates an embodiment of an augmented reality headset and a corresponding neckband.

The embodiments discussed in this disclosure may also be implemented in AR systems that include one or more NEDs. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While AR system 200 includes two displays, embodiments of this disclosure may be implemented in AR systems with a single NED or more than two NEDs.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. In some embodiments, AR system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof.

AR system 200 may also include a microphone array with a plurality of acoustic sensors 220(A)-220(J), referred to collectively as acoustic sensors 220. Acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on frame 210, and/or acoustic sensors 220(1) and 220(J), which may be positioned on a corresponding neckband 205.

The configuration of acoustic sensors 220 of the microphone array may vary. While AR system 200 is shown in FIG. 2 as having ten acoustic sensors 220, the number of acoustic sensors 220 may be greater or less than ten. In some embodiments, using higher numbers of acoustic sensors 220 may increase the amount of audio information collected and/or the sensitivity and accuracy of the audio information. In contrast, using a lower number of acoustic sensors 220 may decrease the computing power required by a controller 250 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

Acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal. Having an acoustic sensor positioned next to an ear canal of a user may enable the microphone array to collect information on how sounds arrive at the ear canal. By positioning at least two of acoustic sensors 220 on either side of a user's head (e.g., as binaural microphones), AR device 200 may simulate binaural hearing and capture a 3D stereo sound field around about a user's head. In some embodiments, the acoustic sensors 220(A) and 220(B) may be connected to AR system 200 via a wired connection, and in other embodiments, the acoustic sensors 220(A) and 220(B) may be connected to AR system 200 via a wireless connection (e.g., a Bluetooth connection). In still other embodiments, acoustic sensors 220(A) and 220(B) may not be used at all in conjunction with AR system 200.

Acoustic sensors 220 on frame 210 may be positioned along the length of the temples, across the bridge, above or below display devices 215(A) and 215(B), or some combination thereof. Acoustic sensors 220 may be oriented such that the microphone array is able to detect sounds in a wide range of directions surrounding the user wearing AR system 200. In some embodiments, an optimization process may be performed during manufacturing of AR system 200 to determine relative positioning of each acoustic sensor 220 in the microphone array.

AR system 200 may further include or be connected to an external device. (e.g., a paired device), such as neckband 205. As shown, neckband 205 may be coupled to eyewear device 202 via one or more connectors 230. Connectors 230 may be wired or wireless connectors and may include electrical and/or non-electrical (e.g., structural) components. In some cases, eyewear device 202 and neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 205 may be communicatively coupled with eyewear device 202 and/or to other devices. The other devices may provide certain functions (e.g., tracking, localizing, depth mapping, processing, storage, etc.) to AR system 200. In the embodiment of FIG. 2, neckband 205 may include two acoustic sensors (e.g., 220(1) and 220(J)) that are part of the microphone array (or potentially form their own microphone subarray). Neckband 205 may also include a controller 225 and a power source 235.

Acoustic sensors 220(1) and 220(J) of neckband 205 may be configured to detect sound and convert the detected sound into an electronic format (analog or digital). In the embodiment of FIG. 2, acoustic sensors 220(1) and 220(J) may be positioned on neckband 205, thereby increasing the distance between neckband acoustic sensors 220(1) and 220(J) and other acoustic sensors 220 positioned on eyewear device 202. In some cases, increasing the distance between acoustic sensors 220 of the microphone array may improve the accuracy of beamforming performed via the microphone array. For example, if a sound is detected by acoustic sensors 220(C) and 220(D) and the distance between acoustic sensors 220(C) and 220(D) is greater than, e.g., the distance between acoustic sensors 220(D) and 220(E), the determined source location of the detected sound may be more accurate than if the sound had been detected by acoustic sensors 220(D) and 220(E).

Controller 225 of neckband 205 may process information generated by the sensors on neckband 205 and/or AR system 200. For example, controller 225 may process information from the microphone array that describes sounds detected by the microphone array. For each detected sound, controller 225 may perform a direction of arrival (DOA) estimation to estimate a direction from which the detected sound arrived at the microphone array. As the microphone array detects sounds, controller 225 may populate an audio data set with the information. In embodiments in which AR system 200 includes an IMU, controller 225 may compute all inertial and spatial calculations from the IMU located on eyewear device 202. Connector 230 may convey information between AR system 200 and neckband 205 and between AR system 200 and controller 225. The information may be in the form of optical data, electrical data, wireless data, or any other transmittable data form. Moving the processing of information generated by AR system 200 to neckband 205 may reduce weight and heat in eyewear device 202, making it more comfortable to a user.

Power source 235 in neckband 205 may provide power to eyewear device 202 and/or to neckband 205. Power source 235 may include, without limitation, lithium-ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more IMUs, one or more tracking emitters or detectors, and/or any other suitable device or system for creating an artificial reality experience.

Artificial reality systems may include a variety of types of visual feedback mechanisms. For example, display devices in AR system 200 and/or VR system 300 may include one or more liquid-crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 200 and/or VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 100, AR system 200, and/or VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

Figure 3:
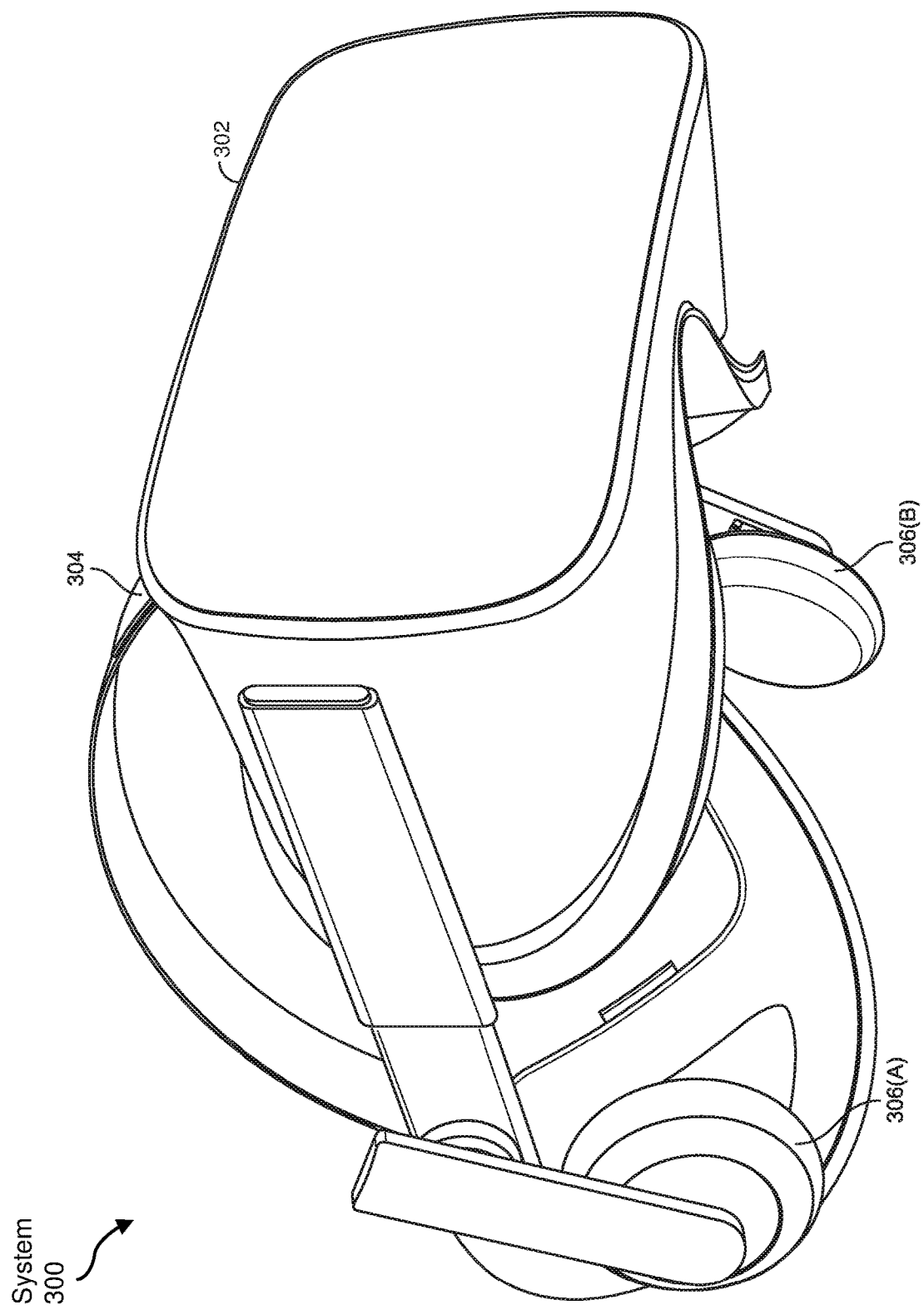
FIG. 3 illustrates an embodiment of a virtual reality headset.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, vision aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may also be used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 100, 200, and 300 of FIGS. 1-3, respectively) may incorporate any or all of these types of sensors to perform SLAM operations such as creating and continually updating maps of a user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a DOA analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Figure 4:
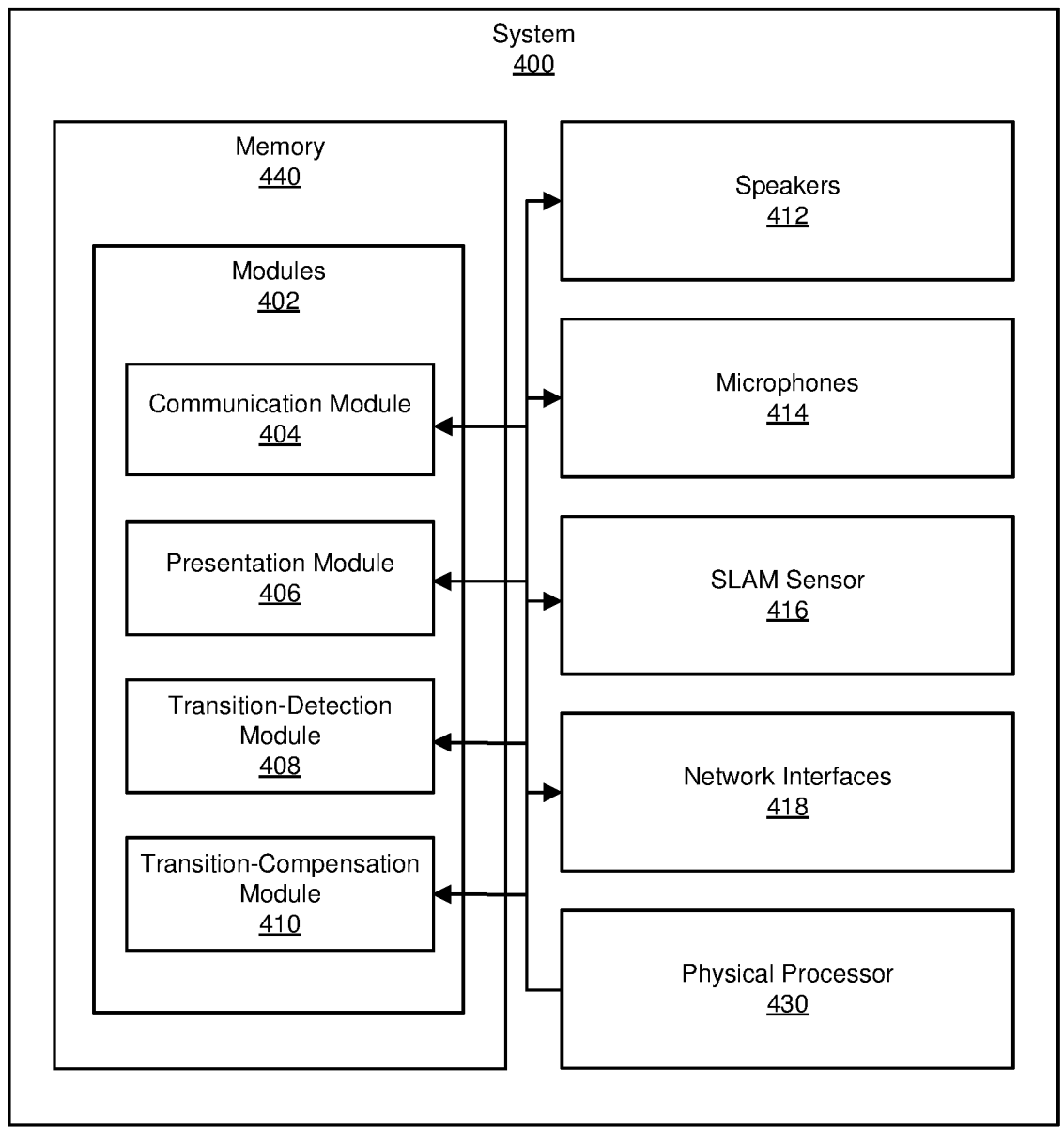
FIG. 4 is a block diagram of an exemplary system for transitioning conversations between communication channels, according to aspects of the present disclosure.

FIG. 4 is a block diagram of an exemplary system 400 for automatically and smoothly transitioning conversations between different communication channels. As illustrated in this figure, example system 400 may include one or more modules 402 for performing one or more tasks. As will be explained in greater detail below, modules 402 may include a communication module 404 configured to (1) establish a communication channel between two computing devices to indirectly convey a conversation between users of the computing devices and (2) relay portions of the conversation between the two computing devices over the communication channel. Modules 402 may also include a presentation module 406 configured to present the conversation to users, a transition-detection module 408 configured to detect alternative communication channels capable of conveying the conversation, and a transition-compensation module 410 configured to (1) determine any human-perceivable differences between how the conversation has been or will be conveyed via two different communication channels and (2) compensate for the human-perceivable differences when presenting the conversation to the users in order to smoothly transition the conversation between the different communication channels. Although illustrated as separate elements, one or more of modules 402 in FIG. 4 may represent portions of a single module or application.

In certain embodiments, one or more of modules 402 in FIG. 4 may represent one or more software applications or programs that, when executed by a computing device, may cause the computing device to perform one or more tasks. For example, and as will be described in greater detail below, one or more of modules 402 may represent modules stored and configured to run on one or more computing devices, such as the devices illustrated in FIG. 5 (e.g., computing device 502 and/or computing device 506). One or more of modules 402 in FIG. 4 may also represent all or portions of one or more special-purpose computers configured to perform one or more tasks.

As illustrated in FIG. 4, example system 400 may also include one or more memory devices, such as memory 440. Memory 440 generally represents any type or form of volatile or non-volatile storage device or medium capable of storing data and/or computer-readable instructions. In one example, memory 440 may store, load, and/or maintain one or more of modules 402. Examples of memory 440 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 4, example system 400 may also include one or more physical processors, such as physical processor 430. Physical processor 430 generally represents any type or form of hardware-implemented processing unit capable of interpreting and/or executing computer-readable instructions. In one example, physical processor 430 may access and/or modify one or more of modules 402 stored in memory 440. Examples of physical processor 430 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 4, example system 400 may also include one or more additional elements, such as speakers 412 capable of presenting audio aspects of conversations to users, microphones 414 capable of capturing audio aspects of conversations, SLAM sensor 416 capable of simultaneously mapping a device's environment and localizing the device's position and orientation within the environments, and network interfaces 418 capable of establishing communication channels between two devices over a network. In some examples, speakers 412 and/or microphones 414 may be configured for and capable of spatial selectivity (e.g., beamforming). While not illustrated in FIG. 4, example system 400 may also include additional elements for capturing and presenting aspects of a conversation between users. For example, example system 400 may also include one or more cameras for capturing visual aspects of conversations and/or one or more displays for presenting visual aspects of conversations.

Figure 5:
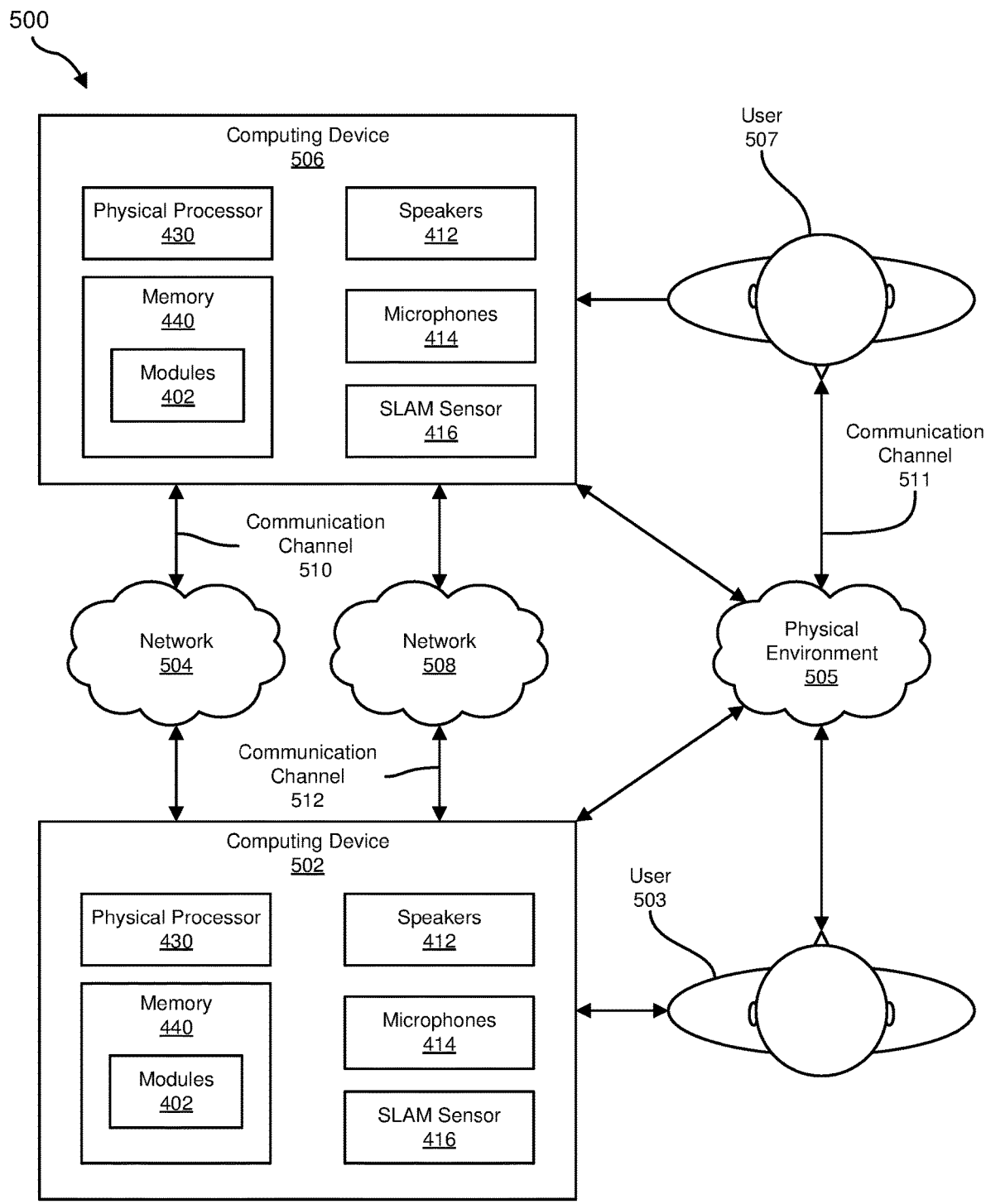
FIG. 5 is a block diagram of another exemplary system for transitioning conversations between communication channels, according to aspects of the present disclosure.

Example system 400 in FIG. 4 may be implemented in a variety of ways. For example, all or a portion of example system 400 may represent portions of an example system 500 in FIG. 5. As shown in FIG. 5, system 500 may include a computing device 502 of a user 503 in communication with a computing device 506 of a user 507 via network 504 and/or network 508. In at least one example, computing device 502 may be programmed with one or more of modules 402. Additionally or alternatively, computing device 506 may be programmed with one or more of modules 402.

In at least one embodiment, one or more modules 402 from FIG. 4 may, when executed by computing device 502 and/or computing device 506, enable computing device 502 and/or computing device 506 to perform one or more operations to automatically and smoothly transition a live conversation of user 503 and user 507 amongst a communication channel 510 enabled by network 504, a communication channel 512 enabled by network 508, and/or a communication channel 511 enabled by a physical environment 505 of user 503 and user 507.

For example, as will be described in greater detail below, one or more modules 402 from FIG. 4 may, when executed by computing device 502 and/or computing device 506, enable computing device 502 and/or computing device 506 to establish communication channel 510 over network 504 to indirectly convey a conversation (e.g., conversation 702 in FIG. 7) between user 503 and user 507. Computing device 502 may then receive, from computing device 506 via communication channel 510, a first portion of the conversation and may present the first portion of the conversation to user 503. Computing device 502 may later receive, from computing device 506 via communication channel 510, a second portion of the conversation. Before presenting the second portion of the conversation to user 503, computing device 502 may detect communication channel 511 or communication channel 512 capable of conveying the conversation between user 503 and user 507. In response, computing device 502 may determine a human-perceivable difference between how the conversation has been conveyed via communication channel 510 and how the conversation will be conveyed via communication channel 511 or communication channel 512 and may compensate for the human-perceivable difference when presenting the second portion of the conversation to user 503 in order to smoothly transition the conversation from communication channel 510 to communication channel 511 or communication channel 512.

In another example, as will be described in greater detail below, one or more modules 402 from FIG. 4 may, when executed by computing device 502 and/or computing device 506, enable computing device 502 to monitor an additional conversation between user 503 and user 507 conveyed via communication channel 511, (2) establish or re-establish communication channel 510 or communication channel 512 capable of indirectly conveying the additional conversation between user 503 and user 507, (3) receive a second portion of the additional conversation, (4) determine a human-perceivable property of the conversation conveyed via communication channel 511, and (5) compensate for the human-perceivable property when presenting the second portion of the additional conversation to user 503 in order to smoothly transition the conversation from communication channel 511 to communication channel 510 or communication channel 512.

Computing device 502 and computing device 506 generally represent any type or form of computing device capable of reading and/or executing computer-executable instructions. Examples of computing device 502 include, without limitation, servers, desktops, laptops, tablets, cellular phones, (e.g., smartphones), personal digital assistants (PDAs), multimedia players, embedded systems, wearable devices (e.g., smart watches, smart glasses, head-mounted displays, etc.), gaming consoles, AR and VR devices (such as systems 100, 200, and 300 of FIGS. 1-3, respectively), combinations of one or more of the same, or any other suitable computing device.

Network 504 and network 508 generally represent any medium or architecture capable of facilitating communication and/or data transfer between computing device 502 and/or computing device 506. Examples of network 504 and network 508 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, one or more proprietary data connections, and the like. Network 504 or network 508 may facilitate communication or data transfer using wireless or wired connections. In one embodiment, network 504 or network 508 may facilitate communication between computing device 502 and computing device 506.

Many other devices or subsystems may be connected to system 400 in FIG. 4 and/or system 500 in FIG. 5. Conversely, all of the components and devices illustrated in FIGS. 4 and 5 need not be present to practice the embodiments described and/or illustrated herein. The devices and subsystems referenced above may also be interconnected in different ways from those shown in FIG. 5. Systems 400 and 500 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

FIG. 6 is a flow diagram of an example computer-implemented method 600 for smoothly transitioning a conversation from an indirect communication channel. The steps shown in FIG. 6 may be performed by any suitable computer-executable code and/or computing system, including system 400 in FIG. 4, system 500 in FIG. 5, and/or variations or combinations of one or more of the same. In one example, each of the steps shown in FIG. 6 may represent an algorithm whose structure includes and/or is represented by multiple sub-steps, examples of which will be provided in greater detail below.

As illustrated in FIG. 6, at step 610 one or more of the systems described herein may establish, between a first computing device and a second computing device, a first communication channel to indirectly convey a conversation between a first user of the first computing device and a second user of the second computing device. FIG. 7 illustrates an exemplary timeline 700 of a live audio conversation 702 between user 507 and user 503 in FIG. 5. In this example, conversation 702 may represent live audio as spoken by user 507, received conversation 704 may represent conversation 702 as received by computing device 502 via communication channel 510, received conversation 706 may represent conversation 702 as received by computing device 502 via communication channel 511, and perceived conversation 708 may represent conversation 702 as presented to and/or perceived by user 503.

Figure 8:
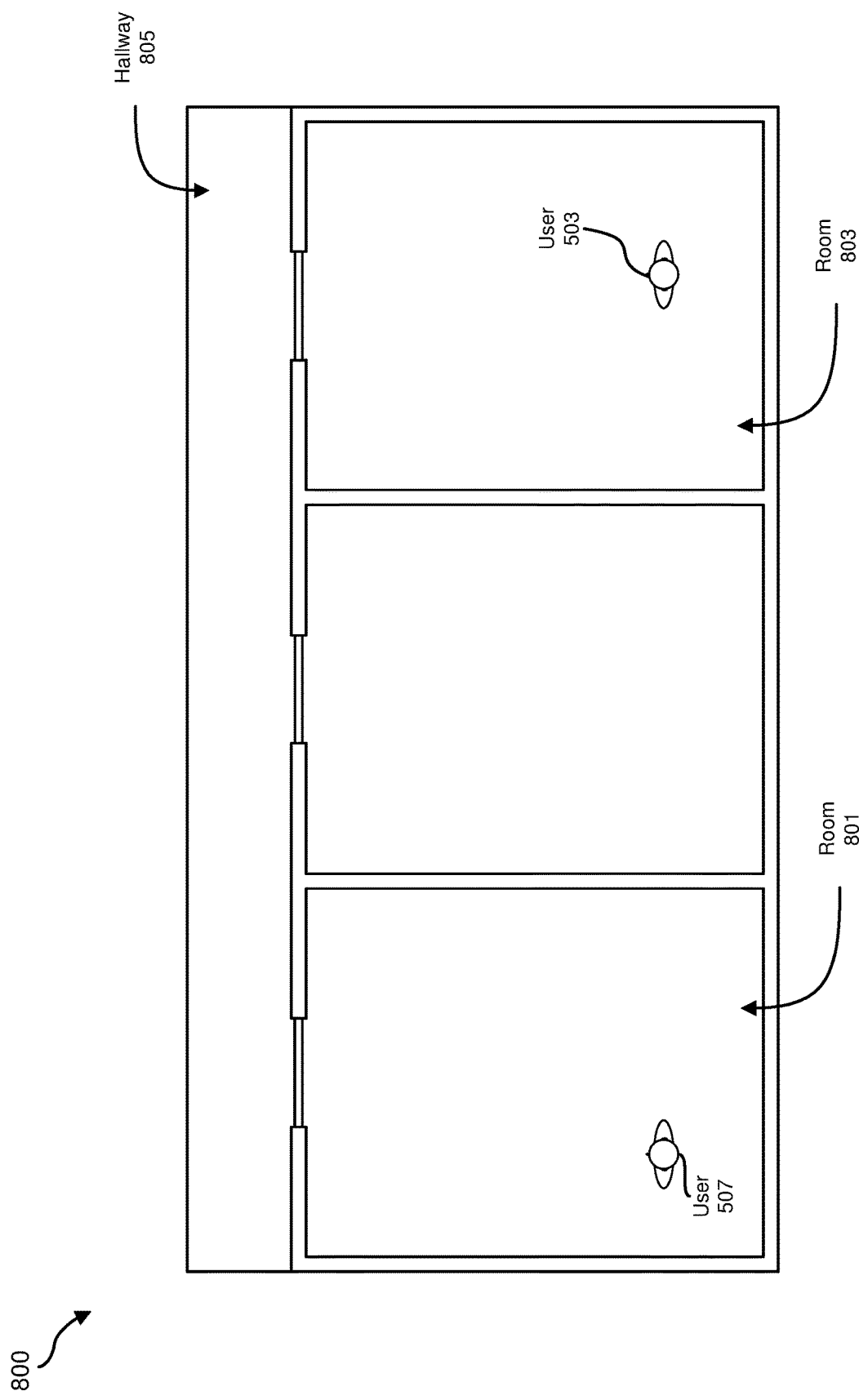
FIG. 8 is a diagram of an exemplary first state of participants of the exemplary conversation illustrated in FIG. 7, according to aspects of the present disclosure.

In one example, computing device 502 and computing device 506 in FIG. 5 may establish, prior to T1 on timeline 700, communication channel 510 over network 504 to indirectly convey live audio conversation 702 between user 503 and user 507 when user 503 and user 507 are in an exemplary state 800 in FIG. 8. As shown, in exemplary state 800, user 503 and 507 may be unable to communicate directly as a result of user 503 being in room 803 and user 507 being in room 801; however, they may be able to communicate indirectly via computing device 502 and computing device 506.

At step 620, one or more of the systems described herein may receive, from the second computing device at the first computing device via the first communication channel, a first portion of the conversation. For example, computing device 502 may receive, from computing device 506 via communication channel 510, portion 710 of conversation 702. As shown in FIG. 7, portion 710 of conversation 702 may have started at time T1 but may not have started to be received at computing device 502 until time T2 as a result of a delay in transmission over communication channel 510. At step 630, one or more of the systems described herein may present, via the first computing device, the first portion of the conversation to the first user. For example, computing device 502 may present, at time T3, portion 710 of conversation 702 to user 503 via speakers 412. As shown in FIG. 7, portion 710 of conversation 702 may have started at time T1 but may not have started to be perceived by user 503 until time T3 as a result of a delay 718 in conveying conversation 702 over communication channel 510.

In some examples, the systems described herein may establish a communication channel between (1) a computing device of a first user that is having a conversation with at least one other person and (2) a computing device of a second user that has not yet participated in the conversation. In these examples, the systems described herein may have recorded, at the computing device of the first user, a prior portion of the conversation that occurred before the second user joined the conversation. In these examples, the systems described herein may transmit from the computing device of the first user to the computing device of the second user this prior portion of the conversation and may present this prior portion of the conversation at an increased speed to the second user to help the second user quickly get caught up on the conversation.

Figure 9:
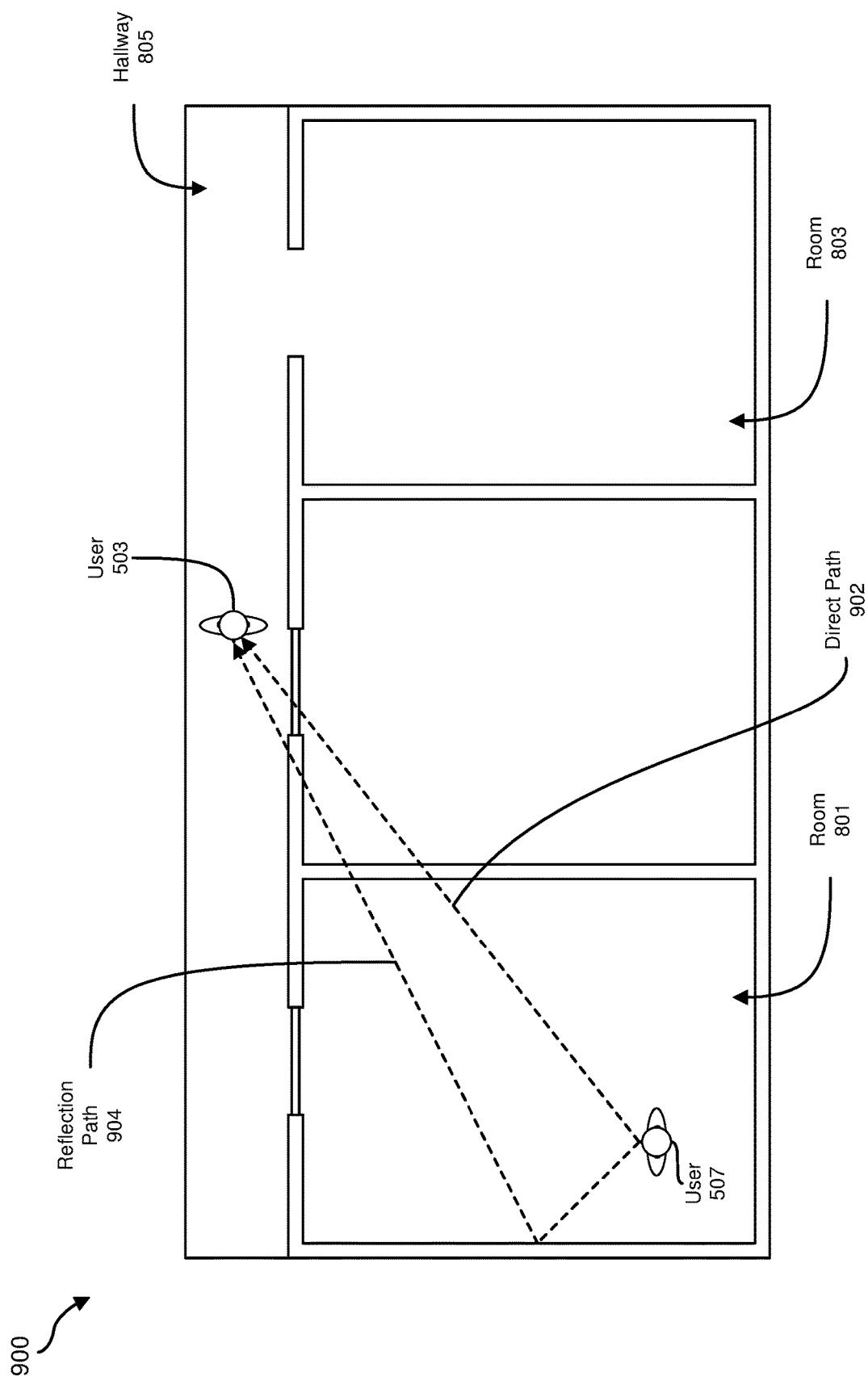
FIG. 9 is a diagram of an exemplary second state of the participants of the exemplary conversation illustrated in FIG. 7, according to aspects of the present disclosure.

At step 640, one or more of the systems described herein may receive, from the second computing device at the first computing device via the first communication channel, a second portion of the conversation. For example, computing device 502 may begin to receive, from computing device 506 via communication channel 510, portion 712 of conversation 702 at time T4 on timeline 700 when user 503 and user 507 are in an exemplary state 900 in FIG. 9. As shown, in exemplary state 900, user 503 and user 507 may still be unable to communicate directly as a result of user 507 being in room 801 and user 503 being in hallway 805; however, they may still be able to communicate indirectly via computing device 502 and computing device 506.

At step 650, one or more of the systems described herein may detect a second communication channel capable of conveying the conversation between the first user and the second user. In some examples, the systems described herein may determine, while a conversation is being conveyed via one indirect communication channel, that an additional indirect communication channel is also capable of conveying the conversation. For example, computing device 502 may determine, while conversation 702 is being conveyed via communication channel 510, that communication channel 512 is also capable of conveying conversation 702. In some situations, transitioning a conversation to a secondary indirect communication channel may be advantageous (e.g., when the secondary communication channel is able to convey the conversation at a higher quality level and/or with less perceivable artifacts). For at this reason, the systems described herein may, while a conversation is being conveyed via an indirect communication channel, continually or periodically search for alternative indirect communication channels to which the conversation may be transitioned.

In some examples, the systems described herein may likewise determine, while a conversation is being conveyed via an indirect communication channel, that a physical environment is or will be capable of conveying the conversation. For example, computing device 502 may detect or predict, at or before T5 of timeline 700, that physical environment 505 will be capable of conveying conversation 702 between user 503 and user 507.

The systems described herein may detect or predict when a physical environment is or will be capable of conveying a conversation in a variety of ways. For example, the systems described herein may use SLAM data and/or histories of user movements to predict or detect when two participants of an indirect conversation will be present within the same physical environment and able to maintain a direct in-person conversation. In some examples, the systems described herein may detect when two participants of an indirect conversation will be present within the same physical environment by detecting when one of the two participants enters or is about to enter a room or space occupied by the other participant. Using FIGS. 9 and 10 as an example, computing device 502 or computing device 506 may use SLAM data and/or histories of user movements to detect when user 503 and user 507 will be present within the same physical environment by detecting when user 503 is walking towards room 801, by detecting or predicting when user 503 is about to enter room 801, or by when user 503 enters room 801. In some examples, after predicting or detecting when two participants of an indirect conversation will be present within the same physical environment, the systems described herein may additionally use SLAM data and/or a suitable psychoacoustic model to determine if the two participants will be able to maintain a direct in-person conversation in the physical environment before automatically initiating a transition.

In some examples, the systems described herein may use a microphone to detect when a physical environment is or will be capable of conveying a conversation by using the microphone to detect a portion of the conversation being directly conveyed by the physical environment. Using FIG. 7 as an example, computing device 502 may detect when physical environment 505 is or will be capable of conveying conversation 702 by using microphones 414 to detect, at time T5, portion 712 of conversation 702 being directly conveyed by physical environment 505. In some examples, the systems described herein may be capable of detecting a portion of the conversation being directly conveyed by a physical environment before a participant is able to do the same. As such, in some examples, the systems described herein may determine when a physical environment is capable of directly conveying a direct in-person conversation between two participants by measuring sound pressure levels of the conversation and any background noise in the physical environment and determining that the ratio of the sound pressure level of the conversation to the sound pressure level of the background noise in the physical environment is greater than a predetermined threshold.

At step 660, one or more of the systems described herein may determine a human-perceivable difference between how the conversation has been conveyed via the first communication channel and how the conversation will be conveyed via the second communication channel. For example, computing device 502 may determine that delay 718 when conversation 702 is conveyed via communication channel 510 is longer than delay 720 when conversation 702 is conveyed via communication channel 511.

The systems described herein may determine, track, or predict a variety of human-perceivable differences between how conversations have or will be conveyed via two different communication channels in order to automatically and smoothly transition conversations between the two communication channels. Examples of human-perceivable differences include, without limitation, differences in perceived loudness, differences in perceived clarity, differences in frequency content, differences in temporal delays, differences in spatial localizations, differences in reverberation, differences in acoustic reflections, and/or differences in any other acoustic property.

When conveyed via an indirect stereo communication channel, a conversation is often spatially localized in the center of a user's auditory field when presented to the user. However, when conveyed via a physical environment, a conversation may be spatially localized in a user's auditory field based on the head pose of the user relative to the source of the conversation and the user's surroundings. Using FIGS. 8 and 10 as an example, computing device 506 may spatially localize conversation 702 in the center of the auditory field of user 503 when presenting conversation 702 to user 503 when user 503 is in state 800. However, when conveyed via physical environment 505 in state 1000, conversation 702 may be spatially localized in the auditory field of user 503 based on the head pose of user 503 relative to user 507 and room 801.

In some examples, the systems disclosed herein may use SLAM and/or head-pose data from one or more of the computing devices conveying an indirect conversation to predict various differences in how the indirect conversation would be perceived if it was conveyed directly. Using FIG. 9 as an example, computing device 502 may use SLAM and/or head-pose information data from computing device 502 and/or computing device 506 to estimate direct path 902 or reflection path 904. Computing device 502 may then use estimated direct path 902 or estimated reflection path 904 to further estimate various differences in how conversation 702 is conveyed over communication channel 510 and how conversation 702 will be conveyed via physical environment 505 over direct path 900 or reflection path 904.

At step 670, one or more of the systems described herein may compensate for the human-perceivable difference when presenting, via the first computing device, the second portion of the conversation to the first user in order to smoothly transition the conversation from the first communication channel to the second communication channel. For example, computing device 502 may compensate for the difference in delays 718 and 720 when presenting, via computing device 502, portion 712 of conversation 702 to user 503 in order to smoothly transition conversation 702 from communication channel 510 to communication channel 511.

The systems described herein may automatically and/or smoothly transition a conversation from a prior communication channel to a new communication channel using a variety of methods and techniques that compensate for human-perceivable differences in the way the conversation was perceived when conveyed via the prior communication channel and the way the conversation will be perceived when conveyed via the new communication channel. In some examples, the systems described herein may compensate for a human-perceivable difference by gradually processing a portion of the conversation just prior to when the conversation is transitioned to the new communication channel such that there are little to no human-perceivable differences at the moment the conversation is transitioned to the new communication channel.

In some examples, a conversation conveyed via an indirect communication channel may be conveyed as a substantially dry signal. Alternatively, a conversation conveyed via direct communication channel may contain additional background noises and environmental acoustics. As such, in some examples, the systems described herein may smoothly transition a conversation from an indirect communication channel to a direct communication channel by gradually mixing in destination audio and environmental acoustics into the last portion of the conversation conveyed over the indirect communication channel for a seamless transition to the direct communication channel.

Figure 10:
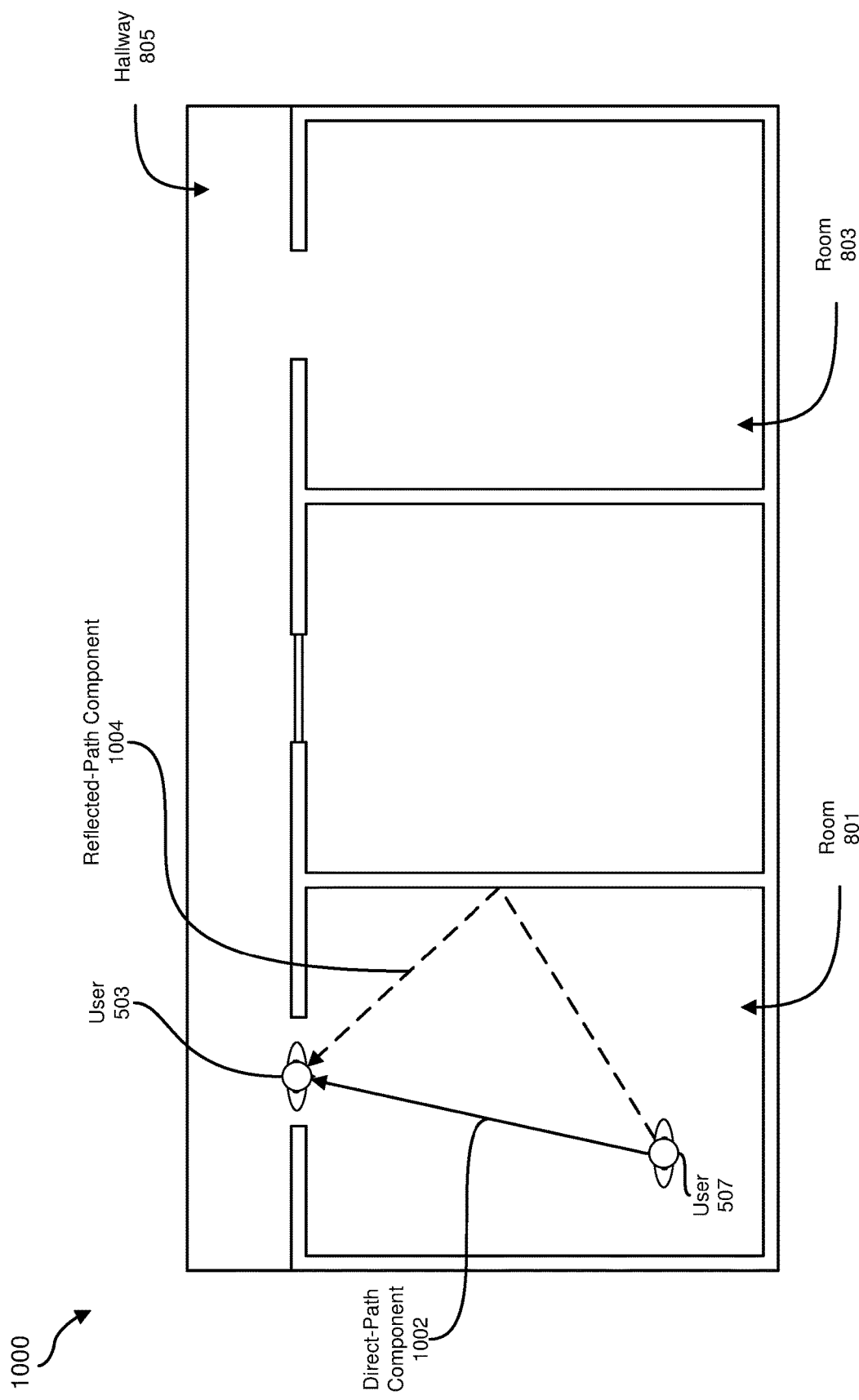
FIG. 10 is a diagram of an exemplary third state of the participants of the exemplary conversation illustrated in FIG. 7, according to aspects of the present disclosure.

In some examples, a conversation conveyed via an indirect stereo communication channel may be spatially localized in the center of a user's auditory field when presented to the user. However, when conveyed via a physical environment, a conversation may be spatially localized in a user's auditory field based on the head pose of the user relative to the source of the conversation and the user's surroundings. As such, in some examples, the systems described herein may smoothly transition a conversation from an indirect stereo communication channel to a direct communication channel by gradually localizing the last portion of the conversation conveyed over the indirect stereo communication channel to match the localization of the conversation conveyed via the direct communication channel. Using FIG. 10 as an example, computing device 502 may smoothly transition conversation 702 from communication channel 510 to communication channel 511 by gradually localizing the last portion of conversation 702 conveyed over communication channel 510 to match the localization of conversation 702 conveyed via communication channel 511. As shown in FIG. 10, conversation 702 conveyed via room 801 may include a direct-path component 1002 and a reflected-path component 1004. In this example, computing device 502 may use SLAM data and head pose information from computing device 502 and/or computing device 506 to gradually localize the last portion of conversation 702 conveyed over communication channel 510 to match the localization of direct-path component 1002 and reflected-path component 1004.

In some examples, a conversation conveyed via an indirect communication channel may have a noticeable delay, and a conversation conveyed via a direct communication channel may have little to no noticeable delay and may be perceived in real time. For example, as seen in FIG. 7, user 503 may hear conversation 702 with delay 718 when conversation 702 is conveyed via communication channel 510 but may hear conversation 702 with a much shorter delay 720 when conveyed via communication channel 511. In these situations, if a conversation abruptly transitions between an indirect communication channel and a direct communication channel, there may be a portion of the conversation being conveyed via the indirect communication channel that is yet unheard and would be lost to the user. For example, as can be seen in FIG. 7, portion 712 of conversation 702 may be received by user 503 via communication channel 511 before user 503 has heard all of portion 710.

To smoothly compensate for a difference in delay when transitioning a conversation from an indirect communication channel to a direct communication channel, the systems describe herein may perform several operations to ensure that a user perceives essentially all of the conversation. First, the systems described herein may temporally compress some of the conversation to catch the user up to a real-time conveyance of the conversation. For example, the systems described herein may temporally compress the last portion of the conversation conveyed via the indirect communication channel while presenting it to the user. Using FIG. 7 as an example, computing device 502 may temporally compress some or all of portion 712 between time T6 and time T7 while presenting portion 712 to user 503. In some examples, the systems described herein may temporally compress some of a conversation by shortening silent sections or vowel sections of the conversation.

While the last portion of a conversation conveyed via an indirect communication channel is being presented to a user, the next portion of the conversation may be simultaneously conveyed via a direct communication channel. For at least this reason, the systems describe herein may (1) record the next portion of the conversation for later presentation, (2) mask, using any suitable auditory masking technique, the next portion of the conversation from being perceived by the user while the user is still being presented with delayed portions of the conversation, and (3) temporally compress the recorded portion of the conversation when presenting it to the user until the user is caught up to their real-time conversation. Using FIG. 7 as an example, computing device 502 may (1) record portion 712 and/or portion 714 of conversation 702 as it is conveyed via communication channel 511, (2) mask portion 712 and/or portion 714 of conversation 702 as it is conveyed via communication channel 511 from being perceived by user 503, and (3) temporally compressing recorded portion 712 and/or portion 714 of conversation 702 as they are presented to user 503 until user 503 is caught up to portion 716 of conversation 702.

In some examples, the systems described herein may compensate for a human-perceivable difference in a particular acoustical property when transitioning a conversation from an indirect communication channel to a different communication channel by processing the last portion of the conversation conveyed over the indirect communication channel such that the acoustical property of the last portion of the conversation conveyed via the indirect communication channel is perceived to have, at least temporarily, the same acoustical property as the next portion of the conversation conveyed via the different communication channel.

In some examples, the human-perceivable differences determined at step 660 may be estimations and may be slightly different than actual human-perceivable differences. In such examples, the systems described herein may measure a more precise human-perceivable difference between how a conversation has been conveyed via a prior communication channel and how the conversation is actually being conveyed via a new communication channel and may further compensate for the actual human-perceivable difference when transitioning the conversation from the prior communication channel to the new communication channel.

In some examples, the systems described herein may attempt to maintain a human-perceivable difference after transitioning a conversation to a new communication channel. In at least one example, the systems described herein may compensate for a human-perceivable difference when transitioning a conversation from an indirect communication channel to a new communication channel by processing the first portion of the conversation that is conveyed over the new communication channel such that a human-perceivable property of the first portion of the conversation that is conveyed over the new communication channel matches, at least temporarily, the same human-perceivable property of the last portion of the conversation that was conveyed over the indirect communication channel. For example, the systems described herein may cause a direct in-person conversation to be perceived as clearly as a prior indirect conversation by applying spatial noise cancellation. Similarly, the systems described herein may cause a direct in-person conversation to be perceived as loudly as a prior indirect conversation by boosting the volume level of the direct in-person conversation.

Figure 11:
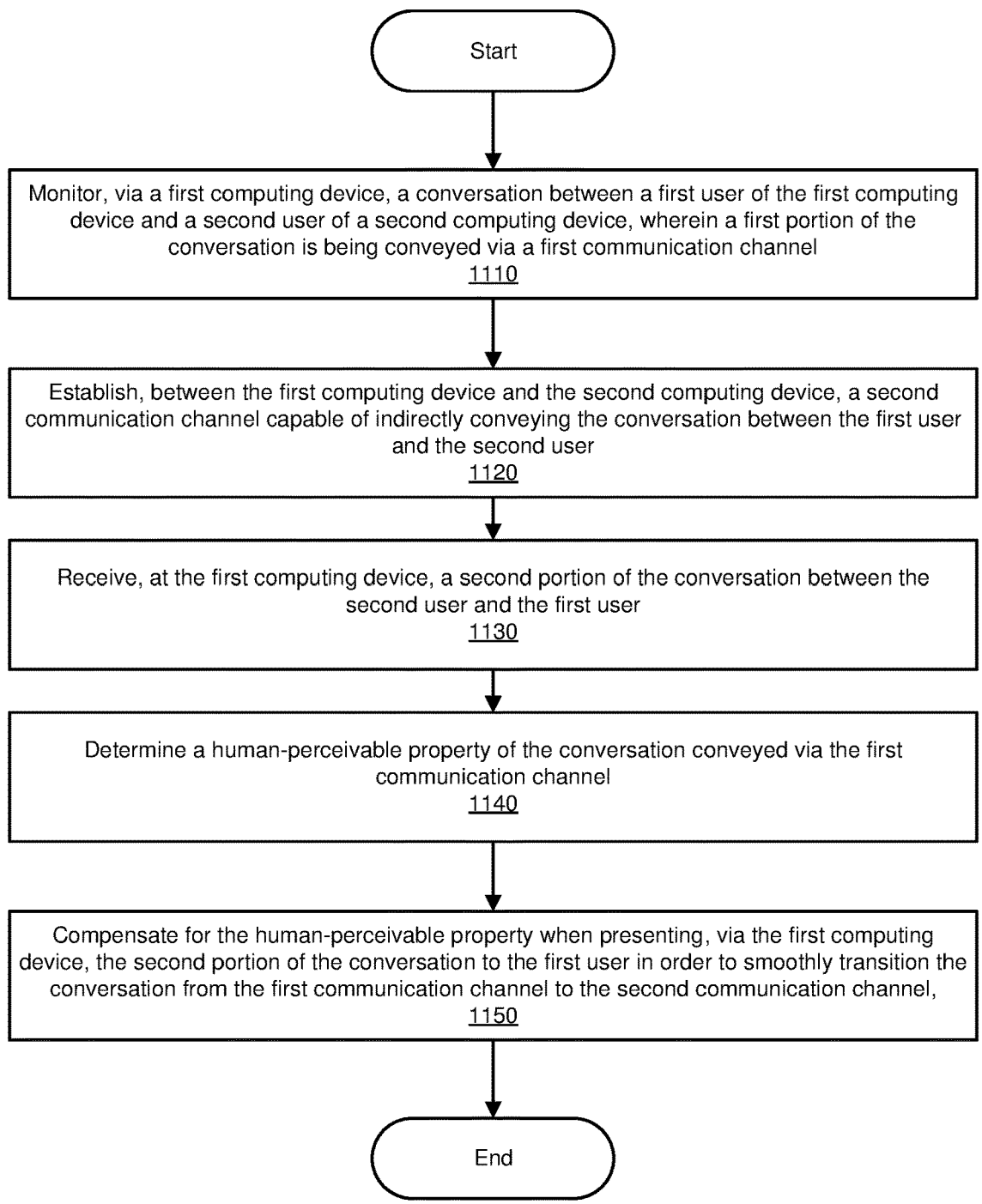
FIG. 11 is a flow diagram of an exemplary method for smoothly transitioning conversations to indirect communication channels, according to aspects of the present disclosure.

FIG. 11 is a flow diagram of an example computer-implemented method 1100 for smoothly transitioning conversations to indirect communication channels. The steps shown in FIG. 11 may be performed by any suitable computer-executable code and/or computing system, including system 400 in FIG. 4, system 500 in FIG. 5, and/or variations or combinations of one or more of the same. In one example, each of the steps shown in FIG. 11 may represent an algorithm whose structure includes and/or is represented by multiple sub-steps, examples of which will be provided in greater detail below.

As illustrated in FIG. 11, at step 1110, the systems described herein may monitor, via a first computing device, a conversation between a first user of the first computing device and a second user of a second computing device wherein a first portion of the conversation is being conveyed via a first communication channel. For example, computing device 502 may monitor conversation 702 being conveyed via physical environment 505.

In some examples, the systems described herein may monitor, via the first computing device, a direct in-person conversation between the first user and at least one other person before the second user joins the direct in-person conversation. In these examples, the systems described herein may record, at the first computing device, a prior portion of the in-person conversation that occurred before the second user joins the conversation. In response to detecting or predicting when the second user will join the direct in-person conversation (e.g., by detecting when the second user walks into the room where the first user is having the conversation), the systems described herein may transmit from the computing device of the first user to the computing device of the second user this prior portion of the direct in-person conversation and may present this prior portion of the direct in-person conversation at an increased speed to the second user to help the second user quickly get caught up on the direct in-person conversation.

At step 1120, one or more of the systems described herein may establish, between the first computing device and the second computing device, a second communication channel capable of indirectly conveying the conversation between the first user and the second user. In some examples, the systems describe herein may establish an indirect communication channel in response to detecting a triggering event (e.g., a rise in noise level, user movements, or verbal cues in the conversation) that indicates that the indirect communication channel will be needed to convey a conversation currently being had via another communication channel. Additionally or alternatively, the systems describe herein may continually attempt to establish a better indirect communication channel by which to convey a conversation currently being had via another indirect communication channel.

At step 1130, one or more of the systems described herein may receive, at the first computing device, a second portion of the conversation. In some examples, the systems described herein may receive the second portion of the conversation via the first communication channel. In other examples, the systems described herein may receive the second portion of the conversation via the second communication channel.

At step 1140, one or more of the systems described herein may determine a human-perceivable property of the conversation conveyed via the first communication channel. The systems described herein may determine, track, or predict a variety of human-perceivable properties of a conversation conveyed via a particular communication channel in order to automatically and smoothly transition the conversation between the two communication channels. Examples of human-perceivable properties include, without limitation, perceived loudness, perceived clarity, frequency content, temporal delays, spatial localizations, reverberations, acoustic reflections, and/or any other acoustic property.

At step 1150, one or more of the systems described herein may compensate for the human-perceivable property when presenting, via the first computing device, the second portion of the conversation to the first user in order to smoothly transition the conversation from the first communication channel to the second communication channel. In some examples, the systems described herein may compensate for a human-perceivable property, such as loudness or spatial localization, of a conversation when presenting the conversation via a different communication channel by processing the conversation such that, when conveyed via the different communication channel, the conversation is perceived to have, at least temporarily, the same human-perceivable property. In some examples, a conversation may have a longer delay when conveyed via an indirect communication channel. In these examples, the systems described herein may compensate for the longer delay by temporally stretching a portion of the conversation during the transition to the indirect communication channel.

As explained above, embodiments of the instant disclosure may process ongoing audio or video conversations conveyed via indirect communication channels in order to automatically and smoothly transition the audio or video conversations into direct in-person conversations when participants of the audio or video conversations meet face to face. Embodiments of the instant disclosure may also process audio or video conversations conveyed via indirect communication channels in order to automatically and smoothly transition direct in-person conversations to the audio or video conversations when the participants of the in-person conversations depart from one another or when their physical environments cannot adequately convey their direct in-person conversations.

In some examples, embodiments of the instant disclosure may use SLAM data and/or other environmental information to detect when users will transition between indirect conversations and direct conversations or vice versa. When indirect conversations have delayed audio, embodiments of the instant disclosure may apply various psychoacoustic models to speed up or compress the audio just prior to transitioning to direct in-person conversations such that the delay is imperceptible. In some examples, embodiments of the instant disclosure may spatially localize audio or video conversations just prior to transitioning to direct in-person conversations such that no spatial disconnect occurs for participants during the transitions.

Embodiments of the instant disclosure may also apply various forms of environmental acoustic processing (e.g., room reverb) to indirect conversations just prior to transitioning the indirect conversations to direct in-person conversations. By applying spatial noise cancellation in noisy environments, embodiments of the instant disclosure may cause direct in-person conversations to be perceived as clearly as prior indirect conversations. By smoothly transitioning live conversations between indirect communication channels and direct communication channels, embodiments of the instant disclosure may maintain live conversations in environments that may not normally enable direct forms of conversation. Accordingly, the disclosed systems may improve existing communication technologies by, among other things, simplifying and automating transitions between direct and indirect conversations.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a portion of a conversation to be transformed, transform the portion of the conversation for presentation to a user during a transition of the conversation between two communication channels, output a result of the transformation to the user, and use the result of the transformation to automatically and smoothly transition the conversation between the two communication channels. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    establishing a first communication channel between a first computing device and a second computing device to indirectly convey a conversation between a first user of the first computing device and a second user of the second computing device;
    receiving, from the second computing device at the first computing device via the first communication channel, a first portion of the conversation;
    presenting, via the first computing device, the first portion of the conversation to the first user;
    receiving, from the second computing device at the first computing device, a second portion of the conversation;
    detecting, before presenting the second portion of the conversation to the first user, a second communication channel capable of conveying the conversation between the first user and the second user;
    determining a human-perceivable difference between how the conversation has been conveyed via the first communication channel and how the conversation will be conveyed via the second communication channel; and
    compensating for the human-perceivable difference when presenting, via the first computing device, the second portion of the conversation to the first user in order to smoothly transition the conversation from the first communication channel to the second communication channel.

2. The computer-implemented method of claim 1, wherein:
    the second communication channel is a physical environment of the first user and the second user; and
    detecting the second communication channel comprises determining when the physical environment of the first user is capable of directly conveying the conversation between the first user and the second user.

3. The computer-implemented method of claim 2, wherein determining when the physical environment is capable of directly conveying the conversation between the first user and the second user comprises detecting, using a simultaneous localization and mapping sensor of the first computing device, when the first user and the second user will be present within the physical environment.

4. The computer-implemented method of claim 3, wherein detecting when the first user and the second user will be present within the physical environment comprises one of:
    detecting the first user entering a room occupied by the second user; or
    detecting the second user entering a room occupied by the first user.

5. The computer-implemented method of claim 2, wherein determining when the physical environment is capable of directly conveying the conversation between the first user and the second user comprises detecting, using a microphone of the first computing device, a third portion of the conversation being directly conveyed by the physical environment from the second user to the first user.

6. The computer-implemented method of claim 1, wherein:
    the prior portion of the conversation comprises a first audio portion;
    the portion of the conversation comprises a second audio portion; and
    a third audio portion of the conversation is conveyed via the second communication channel.

7. The computer-implemented method of claim 1, wherein:
    determining the human-perceivable difference comprises determining that the first user's perceived spatial localization of a third portion of the conversation conveyed via the second communication channel will be different than the first user's perceived spatial localization of the prior portion of the conversation; and
    compensating for the human-perceivable difference when presenting the portion of the conversation comprises presenting at least some of the portion of the conversation to the first user such that the first users perceived spatial localization of the portion of the conversation is substantially similar to the first user's perceived spatial localization of the third portion of the conversation conveyed via the second communication channel.

8. The computer-implemented method of claim 1, wherein:
    determining the human-perceivable difference comprises determining that a perceived acoustic property of a third portion of the conversation conveyed via the second communication channel will be different than the perceived acoustic property of the prior portion of the conversation conveyed via the first communication channel; and
    compensating for the human-perceivable difference when presenting the portion of the conversation comprises presenting the portion of the conversation to the first user such that the perceived acoustic property of at least some of the portion of the conversation conveyed via the first communication channel is substantially similar to the perceived acoustic property of the third portion of the conversation conveyed via the second communication channel.

9. The computer-implemented method of claim 1, wherein:
    determining the human-perceivable difference comprises determining that a temporal delay of a third portion of the conversation conveyed via the second communication channel will be less than a temporal delay of the prior portion of the conversation conveyed via the first communication channel; and compensating for the human-perceivable difference when presenting the portion of the conversation comprises temporally compressing the portion of the conversation before presentation to the first user.

10. The computer-implemented method of claim 9, wherein:

the second communication channel is a physical environment of the first user and the second user; and the computer-implemented method further comprises:
receiving, at the first computing device, the third portion of the conversation;
preventing, at the first computing device while the portion of the conversation is presented to the first user, the first user from perceiving the third portion of the conversation;
temporally compressing the third portion of the conversation; and
presenting, via the first computing device after presenting the portion of the conversation, the third portion of the conversation to the first user.

11. The computer-implemented method of claim 1, wherein:

the second communication channel is a physical environment of the first user and the second user;

determining the human-perceivable difference comprises determining that a third portion of the conversation conveyed via the physical environment will comprise a first direct-path acoustical component and a first reflected-path acoustical component; and compensating for the human-perceivable difference when presenting the portion of the conversation to the first user comprises:
estimating a second direct-path acoustical component for the portion of the conversation;
estimating a second reflected-path acoustical component for the portion of the conversation;
presenting, via the first computing device, the second direct-path acoustical component to the first user such that the first user's perceived spatial localization of the second direct-path acoustical component is substantially similar to the first user's perceived spatial localization of the first direct-path acoustical component; and
presenting, via the first computing device, the second reflected-path acoustical component to the first user such that the first user's perceived spatial localization of the second reflected-path acoustical component is substantially similar to the first user's perceived spatial localization of the first reflected-path acoustical component.

12. The computer-implemented method of claim 1, wherein:

the second communication channel is capable of indirectly conveying the conversation between the first user and the second user;

the computer-implemented method further comprises:
monitoring, via the first computing device, the conversation between the first user of the first computing device and the second user of the second computing device, a prior portion of the conversation being conveyed via the first communication channel; and
establishing, between the first computing device and the second computing device, the second communication channel;

determining the human-perceivable difference comprises determining a human-perceivable property of the conversation conveyed via the first communication channel; and compensating for the human-perceivable difference comprises compensating for the human-perceivable property when presenting, via the first computing device, the portion of the conversation to the first user in order to smoothly transition the conversation from the first communication channel to the second communication channel.

13. The computer-implemented method of claim 12, wherein:

the first communication channel is a physical environment of the first user and the second user; and the computer-implemented method further comprises:
detecting when the physical environment will be incapable of directly conveying the conversation between the first user and the second user; and
making, in response to detecting when the physical environment will be incapable of directly conveying the conversation between the first user and the second user, the transition by using the second communication channel to indirectly convey the portion of the conversation between the first user and the second user.

14. The computer-implemented method of claim 13, wherein detecting when the physical environment will be incapable of directly conveying the conversation between the first user and the second user comprises detecting, using a simultaneous localization and mapping sensor of the first computing device, when the first user and the second user will not both be present within the physical environment.

15. The computer-implemented method of claim 12, wherein:

determining the human-perceivable property comprises determining the first user's perceived spatial localization of the prior portion of the conversation; and compensating for the human-perceivable property when presenting the portion of the conversation comprises presenting at least some of the portion of the conversation to the first user such that the first user's perceived spatial localization of the portion of the conversation is substantially similar to the first user's perceived spatial localization of the prior portion of the conversation conveyed via the first communication channel.

16. The computer-implemented method of claim 12, wherein:

determining the human-perceivable property comprises determining an acoustic property of the prior portion of the conversation conveyed via the first communication channel; and compensating for the human-perceivable property when presenting the portion of the conversation comprises presenting the portion of the conversation to the first user such that the acoustic property of at least some of the portion of the conversation conveyed via the second communication channel is substantially similar to the perceived acoustic property of the prior portion of the conversation conveyed via the first communication channel.

17. The computer-implemented method of claim 12, wherein:

determining the human-perceivable property comprises determining that a temporal delay of a third portion of the conversation conveyed via the second communication channel will be more than a temporal delay of the prior portion of the conversation conveyed via the first communication channel; and compensating for the human-perceivable property when presenting the portion of the conversation comprises temporally stretching the portion of the conversation before presentation to the first user.

18. A communication system comprising:

at least one physical processor; and physical memory comprising computer-executable instructions that, when executed by the physical processor, cause the physical processor to:

establish, between the communication system and an additional communication system, a first communication channel to indirectly convey a conversation between a first user of the communication system and a second user of the additional communication system;

receive, from the additional communication system at the communication system via the first communication channel, a first portion of the conversation;

present, via the communication system, the first portion of the conversation to the first user;

receive, from the additional communication system at the communication system via the first communication channel, a second portion of the conversation;

detect, before presenting the second portion of the conversation to the first user, a second communication channel capable of conveying the conversation between the first user and the second user;

determine a human-perceivable difference between how the conversation has been conveyed via the first communication channel and how the conversation will be conveyed via the second communication channel; and compensate for the human-perceivable difference when presenting, via the communication system, the second portion of the conversation to the first user in order to smoothly transition the conversation from the first communication channel to the second communication channel.

19. The communication system of claim 18, wherein the physical memory further comprises additional computer-executable instructions that, when executed by the physical processor, cause the physical processor to:

monitor, via the communication system, an additional conversation between the first user and the second user, wherein a first portion of the additional conversation is conveyed via the second communication channel;

establish, between the communication system and the additional communication system, a third communication channel capable of indirectly conveying the additional conversation between the first user and the second user;

receive, at the communication system, a second portion of the additional conversation;

determine an additional human-perceivable property of the additional conversation conveyed via the second communication channel; and compensate for the additional human-perceivable property when presenting, via the communication system, the second portion of the additional conversation to the first user in order to smoothly transition the additional conversation from the second communication channel to the third communication channel.

\* \* \* \* \*

UNITED STATES PATENT AND TRADEMARK OFFICE
CERTIFICATE OF CORRECTION

PATENT NO. : 10,574,472 B1
APPLICATION NO. : 16/178231
DATED : February 25, 2020
INVENTOR(S) : Andrew Lovitt et al.

Page 1 of 1

It is certified that error appears in the above-identified patent and that said Letters Patent is hereby corrected as shown below:

In the Claims

In Column 28, Line 37, Claim 7, delete "users" and insert -- user's --, therefor.

Signed and Sealed this
Fifth Day of May, 2020

Andrei Iancu
*Director of the United States Patent and Trademark Office*